Patented Feb. 10, 1953

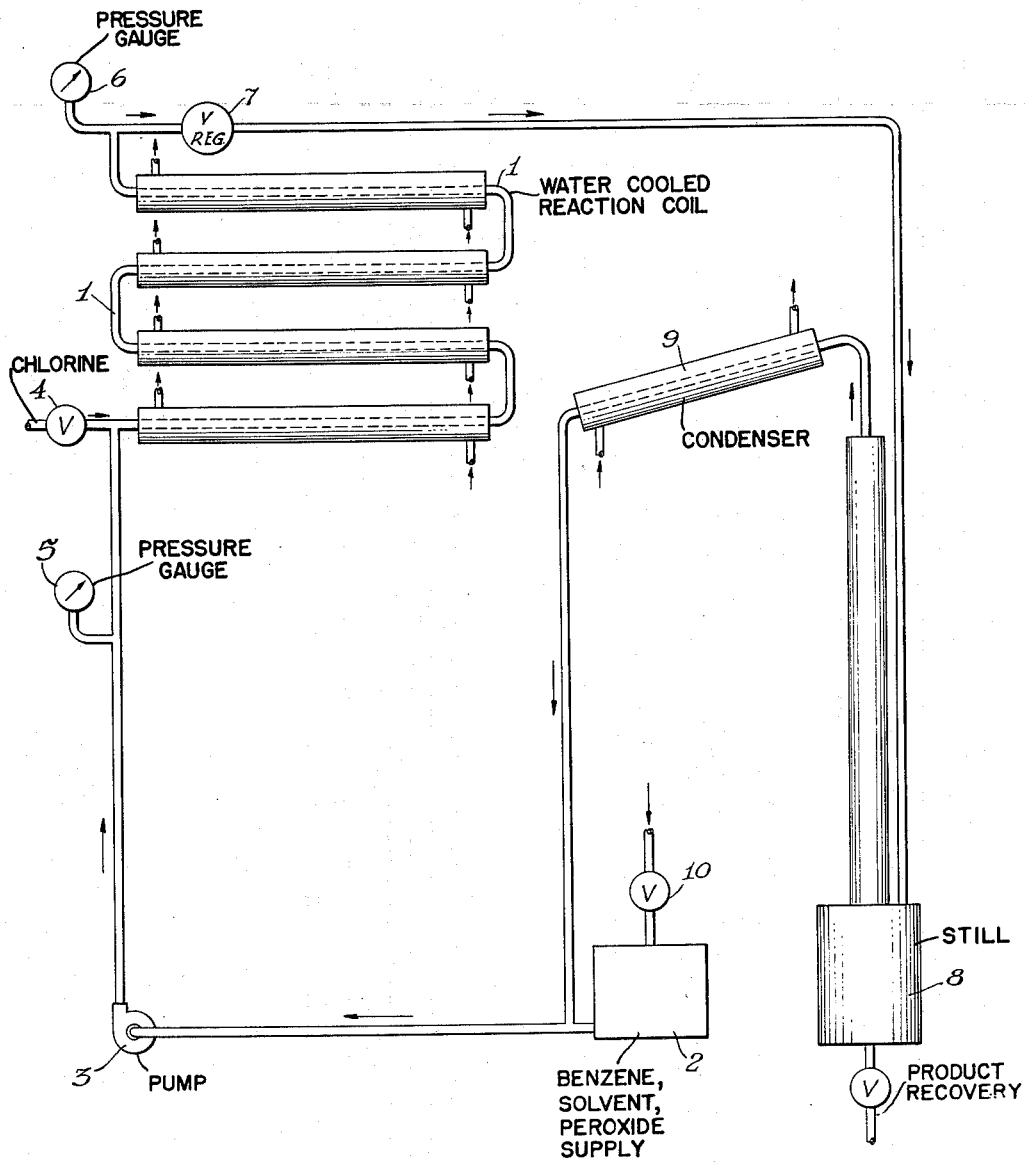

2,628,260

UNITED STATES PATENT OFFICE 2,628,260

CATALYZED AND CONTINUOUS ADDITION CHLORINATION OF BENZENE

Edgar C. Britton, Francis N. Alquist, and Kenneth C. Kauer, Midland, Mich., assignors to The Dow Chemical Company, Midland, Mich., a corporation of Delaware Application May 31, 1949, Serial No. 96,188

4 Claims. (Cl. 260—648)

This invention relates to a method for the preparation of 1,2,3,4,5,6-hexachlorocyclohexane, also known as benzene hexachloride ($C_6H_6Cl_6$). It relates in particular to a continuous method whereby the insecticidally active gamma-isomer of benzene hexachloride is produced in much higher proportion in the crude reaction product and more efficiently than by the heretofore known processes of manufacture.

It was noted by Bender in U. S. Patent No. 2,010,841 that benzene hexachloride appeared to be a good insecticide. Later evidence has shown that the insecticidal activity of the compound is attributable almost exclusively to the gamma-isomer. The usual process for producing benzene hexachloride involves the photochlorination of benzene. That process yields a mixture of isomers in which the gamma-isomer is most commonly present in amounts from 10 to 12 per cent. A similar content of the gamma-isomer is found in the product obtained by chlorinating benzene in the dark using benzoyl peroxide as a catalyst, as described by two of the present inventors in copending application Serial No. 790,018, filed December 5, 1947. The process of chlorination of benzene either with or without light, in the presence of propylene, as described in our copending application Serial No. 695,238, filed September 6, 1946, now Patent No. 2,552,562, dated May 15, 1951, yields benzene hexacloride containing from 10 to 15 per cent gamma-isomer. Several known methods are available for treating the crude mixture of isomers to obtain therefrom a fraction relatively rich in the gamma-isomer. Even if such treatment were to result in isolation of all of the gamma-isomer, which is seldom possible, it would be preferable and more economical to be able to apply the treatment to an isomeric mixture having an initial content of the gamma-isomer considerably higher than the heretofore customary 10 to 12 per cent. Heretofore all the processes for producing benzene hexachloride involved making a batch of the product in a reactor at any one time. It would be preferable and more time-saving to be able to add chlorine continuously to benzene in a continuous reactor rather than in a batch reactor.

It is accordingly among the objects of the present invention to provide a practical, efficient, and economical process for the preparation of benzene hexachloride. A related object is to provide a process capable of being operated in a continuous manner. Another object is to provide a method for the chlorination of benzene by addition whereby there may be obtained continuously, an isomeric mixture of benzene hexachlorides containing consistently 16 per cent or more of the gamma-isomer. Other and related objects may appear hereinafter.

We have already disclosed in our copending application Serial No. 14,628, filed March 12, 1948, that a significant increase in the ratio of the gamma to the other isomers may be obtained when chlorinating benzene by carrying out the reaction using a mixture of benzene and one or a mixture of a particular group of halogenated aliphatic hydrocarbons, and preferably in the presence of methylene chloride. We have shown, further, that the improvement in the proportion of the gamma-isomer is most pronounced when the reaction in the presence of such halo-hydrocarbon is carried out in the dark and in the presence of a catalytically active peroxide.

The halogenated aliphatic hydrocarbons which have been found useful in the process, and whose presence in the reaction mixture results in the formation of a benzene hexachloride containing 16 per cent or more of the insecticidally active gamma-isomer, are all liquid chlorine or bromine substitution products of methane and ethane. The operative compounds are methylene chloride, methylene bromide, methylene chlorobromide, chloroform, ethylidene chloride, ethylene chloride and ethylene chlorobromide.

The amount of the preferred class of halohydrocarbon to be employed in the reaction may vary between wide limits. It is preferable usually to employ from 80 to 96 per cent of the halohydrocarbon with from 20 to 4 per cent of benzene as the liquid medium, but lower proportions of the halohydrocarbon may be used. Thus, for example, the presence of from 1 to 96 per cent of methylene chloride in admixture with benzene has resulted in the formation of benzene hexachloride of which the gamma-isomer content has been in the range from 16 to 18 per cent, as disclosed in said application Serial No. 14,628, filed March 12, 1948, of which this application is a continuation-in-part.

Though benzoyl peroxide is the preferred catalyst, when a peroxide is used in the reaction, it is to be understood that lauroyl and other catalytically active peroxides may be used, as disclosed in the copending application of two of the present inventors, Serial No. 790,018, filed December 5, 1947, and that, in each case, the presence of one of the preferred halohydrocarbons in the reaction medium results in the production of a benzene hexachloride with a higher content of the gamma-isomer than is obtained when using the same peroxide but without the halohydrocarbon.

The present invention consists in a continuous process in which the above-described mixture of one of the preferred halohydrocarbons and benzene is chlorinated under moderate superatmospheric pressure while flowing through a reaction zone in which the temperature is held at a value in the range from 5° to 40° C., recycling the halohydrocarbon with fresh benzene, and recovering the benzene hexachloride continuously from the reaction zone. The new and continuous process has, in addition to the readily apparent advantage of continuity, an unexpectedly high efficiency in the sense that it produces a large amount of the desired product per unit volume of available reaction space per unit time as compared with the customary batch operations.

Though nickel is the preferred lining for the entire continuous process system, it is to be understood that copper, lead, ceramics, glass or similar materials which neither catalyze the substitution chlorination of benzene nor inhibit its chlorination by addition, may be used. The present improved process will be described with reference to the accompanying drawing in which the single figure is a flow sheet of the process. The reaction vessel 1, as shown in the drawing, is essentially a water-cooled coil through which a solution of benzene, methylene chloride, and benzoyl peroxide is caused to flow continuously from the feed tank 2 by means of a pump 3. Simultaneously, chlorine gas is introduced to the reactor 1 at inlet 4. The entire system is operated under a moderate superatmospheric pressure of about 10 to 30 pounds, as measured with pressure gauges 5 and 6. The chlorine dissolves readily in the solution at such pressures and addition of the chlorine to the benzene takes place as the mixture moves through the reactor 1. A temperature in the range from 5° to 40° C. is maintained during reaction by suitable cooling of the reactor coil 1. While the reaction may be substantially complete in 10 to 20 minutes, it is desirable to have a half-hour or more of retention time of the solution in the reactor. This is governed by the length of the coil and the rate of flow. A check valve 7, controlled by a standard adjustable diaphragm regulator (not shown), is used to hold the pressure in the reactor at the desired level. The solution of benzene hexachloride in any unreacted benzene and methylene chloride, together with any excess chlorine, is passed to a still 8 where the methylene chloride and residual traces of chlorine and benzene are distilled continuously from the product, leaving only enough solvent in the product to allow it to flow from the boiler 8. The product is then air dried and pulverized. The distilled methylene chloride and excess chlorine are passed through a condenser 9 and recycled to the reactor 1. In this way, the fresh chlorine added to the reactor after equilibrium is reached may be just over the theoretical amount, and the excess that is desirable for initiating the reaction and carrying it to completion is recycled in the methylene chloride. After the reaction is started, the liquid in feed tank 2 is replenished through inlet 10 by benzene which will preferably contain a reduced amount of the halohydrocarbon and catalyst as compared with the initial feed solution.

The following example illustrates the practice of the invention, but is not to be construed as limiting.

Before the process was started, the feed solution and the reactor were freed of air by blowing gaseous nitrogen through them. The feed solution, having a ratio of 1 pound of benzene containing 10 grams of benzoyl peroxide, to 20 pounds of methylene chloride, was pumped into the reactor coils at the rate of about 1.8 gallons per hour. The reactor coil was made of 1-inch nickel pipe with an over-all length of about 20 feet and had an over-all volume of about 0.9 gallon. The feed rate of 1.8 gallons per hour provided about a half-hour of retention time of the solution in the reactor. Simultaneously, chlorine gas was passed into the reactor at a steady rate. During the first half-hour, 2.9 pounds of chlorine was necessary to initiate and maintain the reaction. Thereafter only slightly over the theoretical ratio of 2.73 pounds of chlorine to every pound of benzene was introduced into the reactor. One pound of fresh benzene was supplied each hour to the feed tank. The temperature in the reactor was maintained at 22°–29° C. by circulating cold water in the jackets surrounding the nickel reactor coil. A gauge pressure of 19 pounds was maintained throughout the entire reaction. For the duration of the run, the average rate of production and recovery of benzene hexachloride was about 2.5 pounds per hour. The benzene hexachloride, according to infra-red analysis, consisted of the following isomers:

alpha—58 per cent
beta—7.5 per cent
gamma—16.9 per cent
delta—13.5 per cent
epsilon—4.1 per cent The yield of 2.5 pounds per hour from the small apparatus described represents a production rate of 20.8 pounds per cubic foot of available reaction space per hour. When, however, the process, as described in our previously identified copending parent application, is run batchwise, the benzene hexachloride produced represents such small values as 0.32 to 5.8 pounds per cubic foot of available reaction space per hour of reaction time, and is correspondingly less when necessary shutdown time for charging and unloading the apparatus is included. To illustrate, a 60 pound batch of benzene hexachloride was produced in a 100 gallon jacketed kettle from 25 pounds of benzene in 500 pounds of methylene chloride. The benzene was chlorinated as fast as it would react and the time required for complete reaction was 14 hours. This batchwise process had a production rate of only 0.32 pounds of benzene hexachloride per cubic foot of available reaction space per hour of reaction time.

We claim:

1. The method which comprises introducing benzene continuously to a circulating stream of a liquid halogenated lower aliphatic hydrocarbon selected from the class consisting of methylene chloride, methylene bromide, methyl chlorobromide, chloroform, ethylidene chloride, ethylene chloride, ethylene chlorobromide, and mixtures thereof, in a ratio to provide in said stream from 99 to 4 per cent of benzene and from 1 to 96 per cent of the halohydrocarbon, and mixing the benzene in said stream continuously with chlorine in the dark, in the presence of catalytic amounts of an organic peroxide, at a reaction temperature maintained in the range from 5° to 40° C., and under a super-atmospheric pressure of 10 to 30 pounds, maintaining the moving reactants under said conditions for at least 10 minutes, separating the resulting mixture of benzene hexachloride isomers from the halohydrocarbon, and recycling the latter with catalyst and fresh benzene to the reaction zone.

2. The method which comprises introducing benzene continuously to a circulating stream of a liquid halogenated lower aliphatic hydrocarbon selected from the class consisting of methylene chloride, methylene bromide, methylene chlorobromide, chloroform, ethylidene chloride, ethylene chloride, ethylene chlorobromide, and mixtures thereof, in a ratio to provide in said stream from 99 to 4 per cent of benzene and from 1 to 96 per cent of the halohydrocarbon, and mixing the benzene in said stream continuously with chlorine in the presence of catalytic amounts of benzoyl peroxide, at a reaction temperature maintained in the range from 5° to 40° C., and under a super-atmospheric pressure of 10 to 30 pounds, maintaining the moving reactants under said conditions for at least 10 minutes, separating the resulting mixture of benzene hexachloride isomers from the halohydrocarbon, and recycling the latter with catalyst and fresh benzene to the reaction zone.

3. The method which comprises introducing benzene continuously to a circulating stream of a methylene chloride in a ratio to provide in said stream from 99 to 4 per cent of benzene and from 1 to 96 per cent of methylene chloride, and mixing the benzene in said stream continuously with chlorine in the dark, in the presence of catalytic amounts of benzoyl peroxide, at a reaction temperature maintained in the range from 5° to 40° C., and under a super-atmospheric pressure of 10 to 30 pounds, maintaining the moving reactants under said conditions for at least 10 minutes, separating the resulting mixture of benzene hexachloride isomers from the halohydrocarbon, and recycling the latter with catalyst and fresh benzene to the reaction zone.

4. The method which comprises introducing benzene continuously to a circulating stream of methylene chloride in a ratio to provide in said stream from 20 to 4 per cent of benzene and from 80 to 96 per cent of methylene chloride, and mixing the benzene in said stream continuously with chlorine in the dark, in the presence of catalytic amounts of benzoyl peroxide, at a reaction temperature maintained in the range from 5° to 40° C., and under a super-atmospheric pressure of 10 to 30 pounds, maintaining the moving reactants under said conditions for at least 10 minutes, separating the resulting mixture of benzene hexachloride isomers from the halohydrocarbon, and recycling the latter with catalyst and fresh benzene to the reaction zone.

EDGAR C. BRITTON.
FRANCIS N. ALQUIST.
KENNETH C. KAUER.

REFERENCES CITED

The following references are of record in the file of this patent:

UNITED STATES PATENTS

| Number | Name | Date |
|---|---|---|
| 2,324,248 | Vaughan et al. | July 13, 1943 |
| 2,513,092 | Gonze | June 27, 1950 |

FOREIGN PATENTS

| Number | Country | Date |
|---|---|---|
| 906,619 | France | May 22, 1945 |
| 922,275 | France | Jan. 27, 1947 |
| 613,519 | Great Britain | Nov. 30, 1948 |
| 469,299 | Belgium | May , 1947 |
| 471,772 | Belgium | Apr. 14, 1947 |

OTHER REFERENCES

Stewart et al., "Jour. Am. Chem. Soc.," vol. 53, pages 1121–8 (1931).

Kharasch: "Jour. of Organic Chemistry," vol. 6, pages 810–17 (1941).